US009118802B2

(12) United States Patent
Smith (10) Patent No.: US 9,118,802 B2
(45) Date of Patent: Aug. 25, 2015

(54) VIDEO TICKET OFFICE (71) Applicant: Cubic Corporation, San Diego, CA (US)

(72) Inventor: Gavin R. Smith, Crawley (GB)

(73) Assignee: Cubic Corporation, San Diego, CA (US)

( * ) Notice: Subject to any disclaimer, the term of this patent is extended or adjusted under 35 U.S.C. 154(b) by 24 days.

(21) Appl. No.: 13/906,068

(22) Filed: May 30, 2013

(65) Prior Publication Data

US 2013/0321561 A1  Dec. 5, 2013

Related U.S. Application Data (60) Provisional application No. 61/653,993, filed on May 31, 2012.

(51) Int. Cl.
| H04N 7/14 | (2006.01) |
| G06Q 10/02 | (2012.01) |
| G07F 17/42 | (2006.01) |
| G06Q 20/18 | (2012.01) |
| G07B 15/02 | (2011.01) |
| G07C 3/00 | (2006.01) |

(52) U.S. Cl.
CPC .............. *H04N 7/141* (2013.01); *G06Q 10/02* (2013.01); *G06Q 20/18* (2013.01); *G07B 15/02* (2013.01); *G07C 3/00* (2013.01); *G07F 17/42* (2013.01)

(58) Field of Classification Search
CPC ....................................................... H04N 7/14
USPC .................... 705/21, 26; 348/14.01, 14.04
See application file for complete search history.

(56) References Cited

U.S. PATENT DOCUMENTS

| 5,386,104 A | 1/1995 | Sime |
| 5,732,398 A * | 3/1998 | Tagawa ............................ 705/5 |
| 5,812,765 A | 9/1998 | Curtis |
| 7,711,601 B2 * | 5/2010 | Pratt et al. ........................ 705/21 |
| 8,479,985 B1 * | 7/2013 | Kropt et al. .................... 235/379 |
| 2004/0169722 A1 | 9/2004 | Pena |
| 2005/0032547 A1 * | 2/2005 | Forrest ........................... 455/551 |
| 2007/0282703 A1 * | 12/2007 | Sharpe et al. .................... 705/26 |
| 2008/0304693 A1 * | 12/2008 | Lau ................................ 381/388 |
| 2011/0234514 A1 * | 9/2011 | Gothard .......................... 345/173 |
| 2011/0313937 A1 * | 12/2011 | Moore et al. ................... 705/307 |
| 2012/0109367 A1 * | 5/2012 | Fabian ............................ 700/232 |
| 2012/0179602 A1 * | 7/2012 | Wheelock ........................ 705/39 |
| 2012/0189110 A1 * | 7/2012 | Bullard et al. ............ 379/144.03 |

(Continued)

FOREIGN PATENT DOCUMENTS

| DE | 8803573 U | 5/1988 |
| EP | 0959439 A | 11/1999 |
| EP | 1102222 A2 | 5/2001 |
| JP | H0916822 A | 1/1997 |

(Continued)

OTHER PUBLICATIONS

ISR/WO mailed on Oct. 30, 2013 for International Patent Application PCT/US2013/043757 filed on May 31, 2013, all pages.

*Primary Examiner* — Olisa Anwah
(74) *Attorney, Agent, or Firm* — Kilpatrick Townsend & Stockton LLP (57) ABSTRACT

A Video Ticket Office provides interactive agent-assisted transportation service requests using real-time video and audio transmission with a separately-located operator center. A method may allow for changing from agent-assisted transportation service requests to automated services.

14 Claims, 7 Drawing Sheets

(56) References Cited

U.S. PATENT DOCUMENTS

2012/0262271 A1* 10/2012 Torgersrud et al. .......... 340/5.53
2013/0016211 A1* 1/2013 Yeh ............................... 348/143
2013/0184856 A1* 7/2013 Gregerson .................... 700/232

FOREIGN PATENT DOCUMENTS

| WO | 9710562 A | 3/1997 |
| WO | 9930267 A | 6/1999 |
| WO | 2013/181627 | 12/2013 |

* cited by examiner

VIDEO TICKET OFFICE

CROSS-REFERENCE

This application claims the benefit of and is a non-provisional of U.S. Provisional Application No. 61/653,993 filed on May 31, 2012, which is incorporated by reference in its entirety for all purposes.

BACKGROUND

Transportation stations often have ticketing booths in which a human service agent is able to provide services to travelers, including sales of tickets, assistance with journey planning, replacement of damaged tickets, among others. An advantage of a trained service agent is the ability to deal with unusual problems or service requests. However, the space at a transportation station is limited, and at many times there is no need for an agent's services.

SUMMARY

This Summary does not in any way limit the scope of the claimed subject matter.

In an embodiment, an Video Ticket Office (VTO) apparatus is disclosed. The VTO may enable agent-assisted transportation service to be provided at the location of the VTO. The VTO may comprise a video display screen, a camera, a microphone, a speaker system, at least one input device and at least one output device, a communication interface module and a computer comprising memory and one or more processors. Any combination of the video display screen, camera, microphone and speaker system may be oriented towards an expected user location. The communication module may be capable of transmitting and receiving real-time video and audio communications from a separately located operator center. The computer system may implement instructions that cause at least one output device to transmit to a user a transportation service output. Non-limiting examples of such transportation service outputs include printed tickets, e-tickets, replacement tickets, itineraries, and agent provided information.

In an alternate and/or additional embodiment, a system is disclosed. The system comprises both an apparatus as above for implementing a VTO for providing an interactive agent-assisted transportation service, and instructions stored in the memory, which when executed by the one or more processors cause the processors to instruct the communication interface module to establish a real-time interactive communication link with the separately located operator center; to output on the video display screen and speaker system video and audio signals of an operator at the operator center; to display information received from the operator center about available services; and to cause at least one output device to transmit a transportation service output to a user.

In another aspect a method is disclosed for providing an interactive agent-assisted transportation service between a Video Ticket Office (VTO) apparatus and a separately located operator center. The method may comprise any combination of the following operations: receiving a user input to initiate agent-assisted interactive transportation service; generating a request from the VTO to the operator center to have agent-assisted transportation service provided interactively; establishing an interactive agent-assisted transportation service communication link between the VTO and the operator center; receiving the interactive agent-assisted transportation service using real-time video and audio communication between the VTO and the operator center over the interactive agent-assisted transportation service communication link; and transmitting to a user a transportation service output.

DESCRIPTION OF THE DRAWINGS

A further understanding of the nature and advantages of various embodiments may be realized by reference to the following figures. The figures only show exemplary embodiments and do not limit the scope of the disclosure. In the appended figures, similar components or features may have the same reference number in different figures. Further, various components of the same type may be distinguished by a number appended to the reference number that distinguishes among the similar components. When only the first reference label is used in the specification, the description is applicable to any one of the similar components having the same first reference label irrespective of the second reference label.

DETAILED DESCRIPTION

Operators of transportation stations such as rail stations often provide ticket booths at which people may be able to purchase tickets, obtain route information and schedules, and have trips planned with the assistance of a human ticket agent, among other services. It is also possible to have automated ticket vending machines (TVM) at the station. In ideal cases, the TVM can provide acceptable customer service for a variety of specific customer requests. However, a computerized TVM is often not able to deal with unusual customer requests or problems. For example, if a customer has soiled or torn an unused but valid ticket, a TVM is not typically able to provide a replacement. A TVM is also unable to match a customer's appearance with a photograph, for example in a passport.

So there are distinct advantages to having ticket booths operated by human agents. However, each such booth is typically located in only one place in the station and often may not be in use by any customers. This is a waste of the agent's talent and time. At other times, there is a surge in the number of customers who would like to interact with a human agent. If there are too few booths with agents, customers are inconvenienced. This can create ill-will towards the system operators. Further, booths large enough to accommodate an agent comfortably are often much larger than a TVM, and so reduce the area available in the station for other uses.

So it would be advantageous to be able to provide an agent's time and talent wherever and whenever they are needed. A station operator may consider having mobile agents, who can open booths in a station as needed, in the same way that a supermarket can vary the number of checking clerks depending on demand. However, the agents would still need to be located at a single station, and there could still be inefficient agent idle time, or alternatively not enough agents to handle a surge in customer requests.

The increase in the data transmission speeds of modern communication technologies makes it possible to transmit and receive video and audio signals of human actions in real-time, i.e. at a frame rate fast enough that the recorded human actions appear natural, with no apparent gaps or skips in the video or audio output.

Such modern communication technologies may allow an agent to be located in an operator center and have his or her image and voice appear at machine at a station and to allow the agent to interact naturally with a customer. If such machine could also capture and transmit images of a customer interacting with the machine to the agent's location, it could be possible to achieve the advantages of a staffed ticket booth.

By having many agents in an operator center, and sufficiently many machines available at multiple stations, the inefficiencies noted above may be significantly reduced. There are many advantages of such virtual interaction between a customer and an agent. The agent may be able to work in a more comfortably appointed operator location. Enough agents may be able to be assigned to virtually assist customers at a station experiencing a rush of requests, and then be reassigned when the rush has diminished. Area once occupied in the transportation station by a ticket booth could serve other uses.

Mere video and audio communication between a separately located operator center and a customer at a station would not replicate the range of customer services that are typically provided by a staffed ticket booth. An aspect of this disclosure is to describe machines, systems and methods for a Video Ticket Office (VTO) which may replicate the customer experience of directly interacting with a staffed ticket booth.

Figure 1:
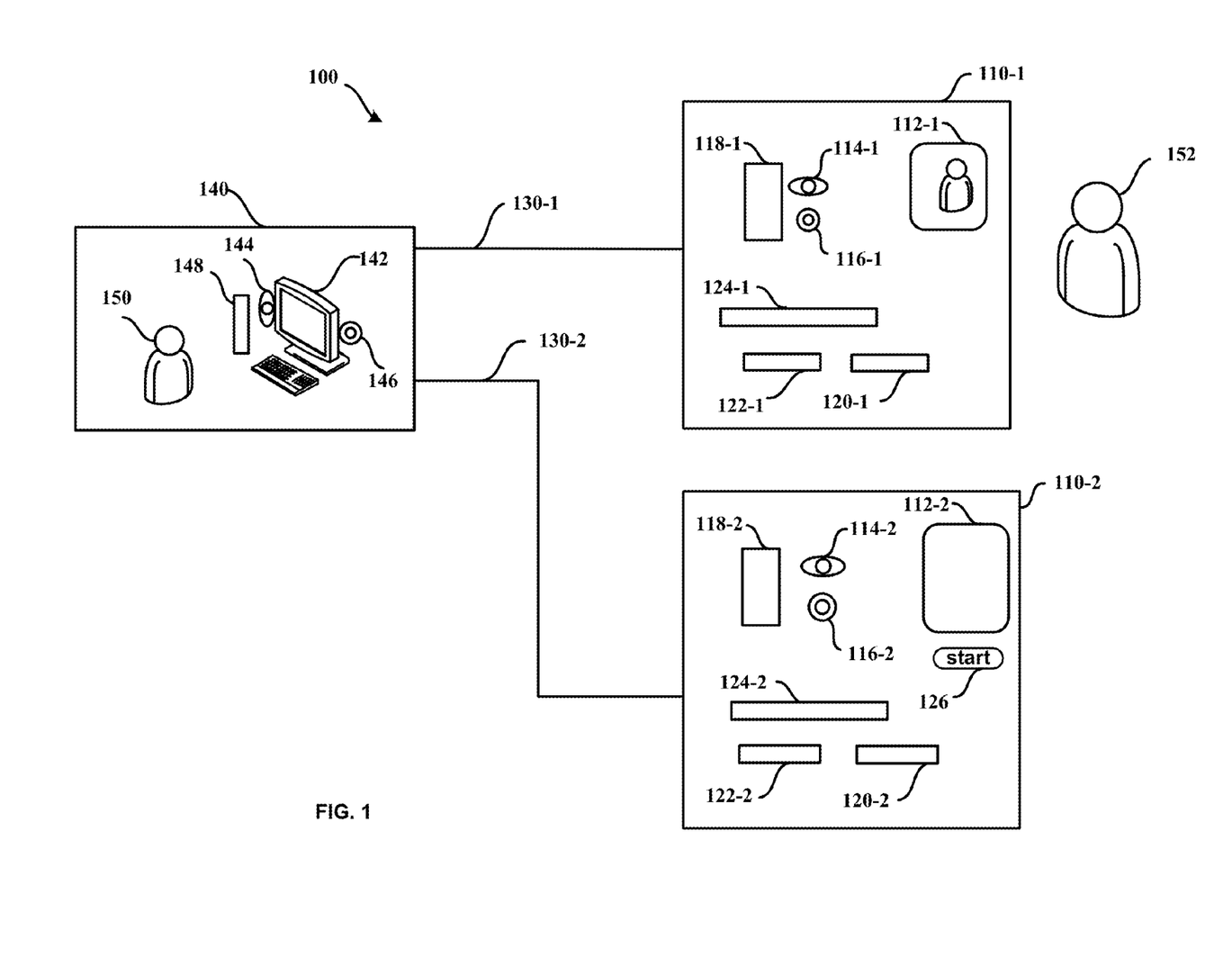
FIG. 1 illustrates an exemplary embodiment of a first and a second Video Ticket Office communicatively linked with an operator center.

Referring now to the block diagram in FIG. 1, the system 100 includes a first VTO 110-1, a second VTO 110-2 and an operator center 140 which may be separately located from one or both VTOs. The operator center 140 may be connected to the first and the second VTOs over respective communication links 130-1 and 130-2, and is staffed by at least one agent 150. A customer 152 may interact with agent 150 using the VTO 110-1 to obtain at least one transportation service output. Non-limiting examples of such transportation service outputs include ticketing, including printing of tickets, scheduling and trip planning, including printing of itineraries, refunds of unused tickets, replacement of damaged tickets, transfer information and boarding locations, among others. Transportation service outputs may be in the form of electronically stored information, for example e-tickets, that is transmitted to a user device.

While two VTOs are shown, it is to be understood that the operator center 140 may be communicatively linked with any number of VTOs. In one aspect, the operator center 140 may be communicatively linked with one VTO, for example at a station where only one VTO at most is needed but there is not enough room or need for a continuously staffed ticket booth.

The first VTO 110-1 may include a video display screen (VDS) 112-1, which displays the video image data of an agent 142 at the operator center 140. The VTO 110-1 also may include a camera 114-1, a microphone 116-1, and a speaker system 118-1. The VTO 110-1 may also include at least one input device 122-1 and at least one output device 120-1. While only one input device 122-1 and one output device 120-1 are shown, it is to be understood that there may be more than one of either device, depending on the capabilities required of the VTO 110-1.

The VDS 112-1 may be sufficiently large to display the video images of an agent 142 at a size to allow a natural viewing experience. In one aspect, the VDS has a 24 inch diagonal. In another aspect, the VDS has a 32 diagonal. A VDS of alternate dimensions may also be used. In one embodiment the VDS is a color display.

In one embodiment, the first VTO 110-1 may comprise a single cabinet style or post-mounted unit, supported on the floor, with the VDS 112-1 at a height comfortable for human viewing. In additional and/or alternate embodiments, the VTO 110-1 may be a wall-mounted unit.

The VTO 110-1 may equipped with a video capable camera 114-1 to observe a user 152, and capable of capturing sufficiently many frames per second so that when replayed at the operator center 140 the user's motions appear lifelike. In one embodiment, the camera 114-1 captures at least 30 frames per second. That said, other embodiments can utilize video with fewer frames per second. Yet other embodiments may employ a varying frame rate, which may depend on available bandwidth and/or other factors.

The VTO 110-1 may be equipped with a microphone 116-1 to obtain the user's speech and relay it to be transmitted to the operator center 140. In one embodiment there may be more than one microphone to obtain stereo sound recordings, or to assist in focusing and filtering the sound reception to be from a location where the user is expected to be while using the VTO.

The VTO 110-1 may be equipped with a speaker system 118-1 so that voice or other audio transmissions may be played for a user to hear. The speaker system may comprise more than one speaker to improve the quality of the sound played for a user. For example, there may be two speakers configured to produce stereo sound. A speaker itself may comprise subspeakers such as a woofer, midrange or tweeter.

In one embodiment, there may be two speaker systems and/or two microphone systems. The first speaker and microphone systems may be used for reproducing, for example, the voice of an agent 150, as described above. The second speaker and microphone system may then be used as part of a noise cancelling system so that a user, located at an expected interaction location, would have ambient station sound reduced. In an additional and/or alternative embodiment, the user 152 could have his or her own speech significantly cancelled outside of the expected user interaction location, and so have security and privacy enhanced.

In addition to voice inputs by the user through the microphone, the VTO 110-1 may have at least one input device 120-1 by which the user is able to give information necessary for obtaining services. Non-limiting examples of such input devices include keypads, keyboards, buttons, touchscreens, barcode readers, magnetic strip readers, and radio frequency identification (RFID) scanners. Other non-limiting examples include radio receivers configured to receive a transmission from a personal communication device of the user, such as a cellphone, smartphone or personal digital assistant (PDA). Other examples are apparent to one of ordinary skill in the art.

In additional and/or alternative embodiments, the VTO 110-1 may comprise a visual scanner as an input device. The scanner may be capable of obtaining an image of an object placed in its viewing direction. In one example, a user could place a damaged ticket in the scanner, and an image of it could be obtained and transmitted to the operator center. The agent could then determine that the ticket was valid but damaged, and issue a replacement. In another embodiment, a scanner input tray could be configured to take a scanned object into the VTO to be inaccessible after being scanned. In the example above, a damaged ticket could be pulled into the VTO so that no other person could attempt to use it. In another example, a passport of a user could be inserted into the scanner for viewing, identification and security.

The VTO 110-1 may also comprise at least one output device 120-1 by which the user is able to receive the results of service requests. Non-limiting examples of such output devices include thermal, dot matrix or laser printers, magnetic strip card printers, RFID transmitters for modifying RFID chip of the user, ticket and/or card dispensers, radio transmitters configured to send signals to a smartphone, cellphone or PDA of the user 152. Other examples are apparent to one of ordinary skill in the art.

The VTO 110-1 may include a computer and communication interface module 124-1 communicatively linked with at least one of the VDS 112-1, camera 114-1, microphone 114-1, speaker 118-1, input device 122-1, output device 120-1 and an external communication link 130-1. The computer and communication interface module may be implemented as separate components or as a single component. The structure of the computer 124-1 is described in greater detail below in reference to FIG. 7. The computer may coordinate the functioning of the devices to which it is linked, and execute instructions stored in a memory. The communication interface module may be a network interface card, wireless transceiver, Ethernet port or another specialized device capable of sending and receiving transmissions to and from an operator center.

In some embodiments of the VTO 110-1, important components may be situated on the VTO so that a human user 152, while in an expected user location in proximity to the VTO, is able to interact with the important components. In one example, important input and output devices, the VDS, the speaker system and the microphones are situated on a front side of the VTO and accessible to a user facing the front side. In one embodiment, the components are situated on the VTO at a height and orientation so as to be accessible to a user in a wheelchair.

FIG. 1 also shows an embodiment of a second VTO 110-2. In an embodiment of the system 100, there may be multiple VTO machines, of varying configurations, able to provide services by communicating with at least one operator center 140. In various embodiments the VTO 110-2 may be located in a station different from the VTO 110-1, or even in another country.

In one embodiment of the VTO 110-2 has a dedicated start button 126 as an input device. By pressing the start button a user may initiate operations to form a communication link with the operator center 140 for interactive service with an agent. In an additional and/or alternative embodiments, by pressing the start button 176, a user may receive a displayed prompt to obtain services either using a real-time interactive mode with an agent, or in an automated agent-free mode. In such an embodiment, the VDS may be a touch screen to receive responses to computerized, menu-driven prompts, or separate input devices may be available for the user to input responses. In such embodiments, the VTO functions much like a TVM. In the embodiment shown if FIG. 1, the VTO 110-2 comprises components analogous to those of the VTO 110-1, including a VDS 112-2, a camera 114-2, microphone 126-2, speaker system 118-2, input device 122-2, output device 120-2 and computer and communication interface module 124-2.

In the embodiment shown in FIG. 1, the VTOs 100-1 and 110-2 have communication links 130-1 and 130-2 with an operator center 140. The communication links may be by a direct connection such as Ethernet cable, coax cable, fiber optic cable, telephone lines or other wired links or any combination thereof. The links 130-1 and 130-2 may also comprise, at least in part, a wireless transmission such as by cellphone, WiFi, Zigbee, BlueTooth or other radio transmission technologies. The links 130-1 and 130-2 may use a combination of wired and wireless technologies, and may be established via private and/or public communication networks (e.g., the internet) and/or dedicated connections. Though not shown in FIG. 1, the links 130-1 and 130-2 may join at a common communication device separate from the VTOs before being linked to an operator center. For example, at a station at least one of the VTOs may be communicatively linked to one or more servers which are connected by an internet link to the operator center. Such a VTO could use a WiFi or other wireless transmission to be connected to a modem attached to a server.

The links 130-1 and 130-2 have sufficient capacity to transmit audio and live video images to implement real-time communication between a user 152 at a VTO with an agent 150 at the operator center.

The operator center 140 may be located at useful distance from VTO 110 to which it is connected by the communication link 130-1. In one example, the operator center may be located in another country from where the VTO is located. In this example an agent 150 could be working during standard daytime hours while providing service at a VTO where it is late at night. In a second example, the operator center may be located within a station and linked to VTOs in the station. This would allow for efficient allocation and reassignment of agents as needed, and provide a more comfortable or safer location for the agents.

In some embodiments, a single VTO 110-1 may be able to establish a real-time video and audio communication link with different operator centers.

In the example shown in FIG. 1 an agent 150 makes use of equipment to provide real-time interactive customer service to the user 152. Non-limiting examples of such equipment may comprise a computer 142, a camera 144, a speaker system 148, and a microphone 146. Such equipment may be separate devices, or some may be integrated into a single physical device. For example, a computer monitor may have a camera, speaker and microphone integrated with the display screen.

Though only one agent 150 is shown in FIG. 1, the operator center may be configured to have multiple agents available each with equipment necessary to provide individual real-time customer service to users.

Figure 2:
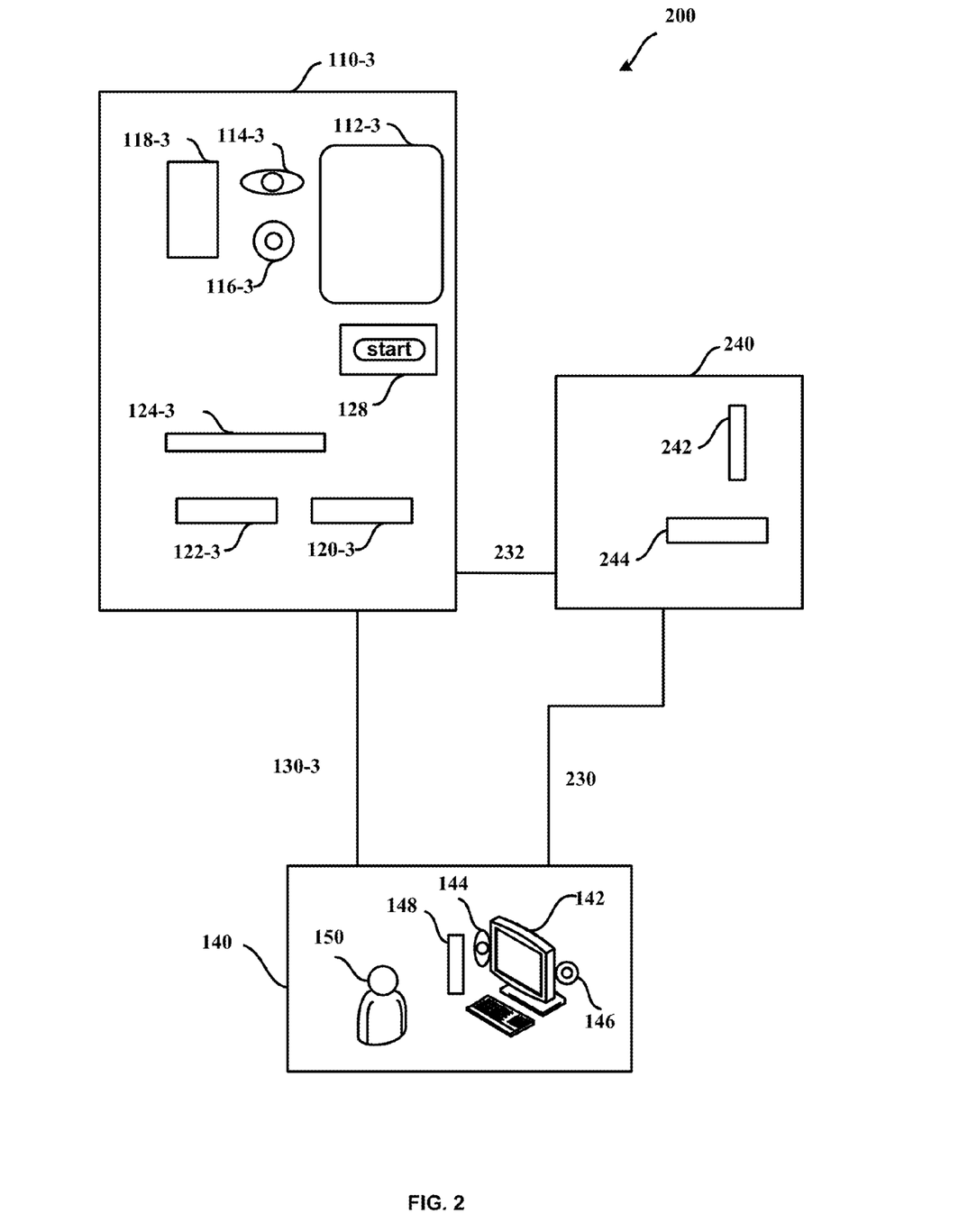
FIG. 2 illustrates an embodiment of a Video Ticket Office and a cash handler.

Referring now to the block diagram shown in FIG. 2, an exemplary system 200 is shown, comprising an embodiment of a VTO 110-3, the operator center 140 as previously described, and a cash handler 240. The cash handler may be an apparatus physically separate from the VTO 210. By being physically separate from the VTO, there is less chance of the VTO being vandalized. The cash handler 240 may be configured to accept cash from a user of the VTO 210, or to dispense cash or an alternate form of value to a user. In one embodiment, the cash handler may be configured print or issue coupons, tickets or vouchers for future transportation service to a user. The cash handler 240 may be configured to accept both coin and bill forms of cash. The cash handler may be configured to accept cash in a variety of currencies.

The cash handler 240 may comprise an input 242 through which a user may deposit cash, as necessary to pay for services being provided. Though only one input 242 is shown, it is understood the cash handler may have multiple inputs. In one example there could be separate inputs for bills and coins. In a further example there could also be inputs such as the payment inputs 122 described above in relation to the VTO 110. In the example that payment inputs are located on a cash handler, less equipment might be needed on VTO 110-3. This may allow the VTO to be more aesthetically appealing. As described below in relation to FIG. 6, having payment inputs available on a separate cash handler may allow the final steps of an agent-assisted service transaction to be completed in an automated mode.

The cash handler 240 may have an output 244, which may be used to issue change after a cash input. Though only one output 244 is shown, it is understood the cash handler may have multiple outputs. In one example there could be separate outputs for coins and bills. In another example there could be other outputs, such as for dispensing, for example, a ticket, receipt, or itinerary.

In FIG. 2, the VTO 110-3 may have a direct communication link 232 with the cash handler 240. The communication link may be either a direct physical link, for example a wired or cable connection, or the link may be by a wireless technology such as WiFi, or the communication link may use a combination of wired and wireless technologies. Other communication links will be apparent to one of ordinary skill in the art.

In additional and/or alternative embodiments, the cash handler may be communicatively linked with more than one VTO. Such an embodiment might allow for fewer cash handlers to be installed in a station, and so reduce the need for servicing cash handlers. Such an embodiment may be implemented in a situation where cash is less likely to be used for payments.

As shown in FIG. 2, in one embodiment the cash handler 240 may have a communication link 230 to the operator center 140 separate from, or in addition to, a communication link 232 with a VTO. The communication link 232 may use any of the technologies discussed above in regards to the communication links 130.

In FIG. 2, the VTO 110-3 may further include an auxiliary display screen 128. In one embodiment the auxiliary display screen is a touchpad screen. In this embodiment agent-assisted service might be assisted by displaying ticketing, scheduling or other information to a user on the auxiliary display screen while reserving the VDS 212 for showing the video of the agent.

Figure 3:
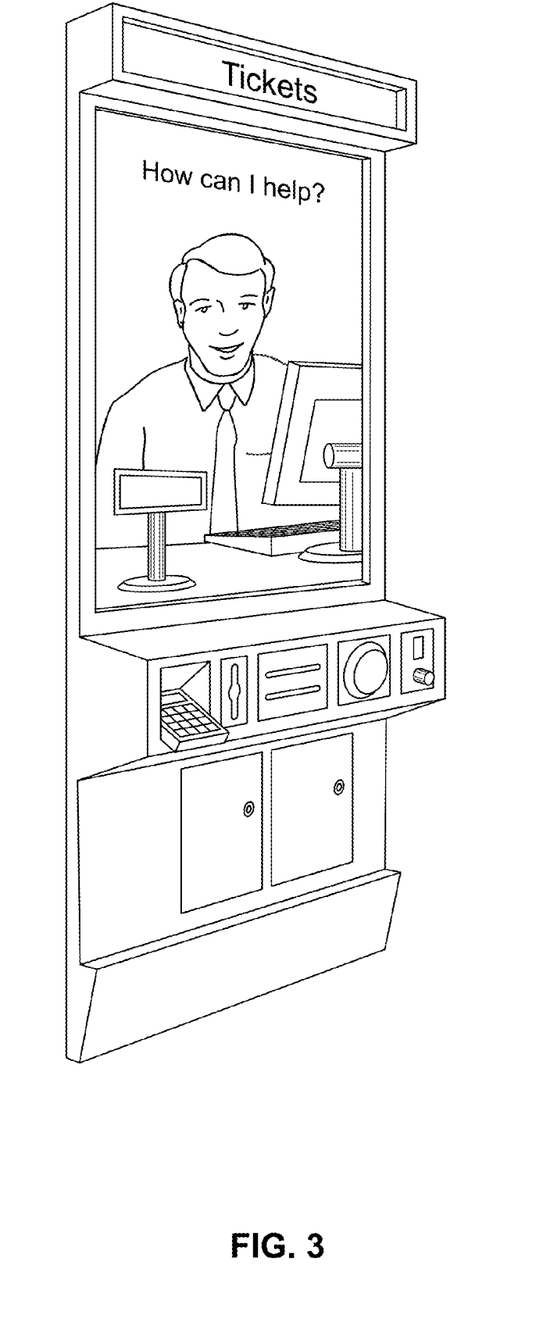
FIG. 3 illustrates an embodiment of a Video Ticket Office.

FIG. 3 shows one example of a configuration for a VTO. Part of the VTO is a VDS large enough to simulate actual face-to-face interaction with an agent, even though the operator may be located at a remote location. The video and audio display of the communications from the agent are received in real-time from the agent's operator center. At the agent's operator center there is also located a speaker system and a video display for displaying to the agent real-time video and audio signals obtained from a camera and a microphone at the VTO. In the example VTO shown, there are various input and output devices by which a user may input information or payments and obtain various outputs.

Figure 4:
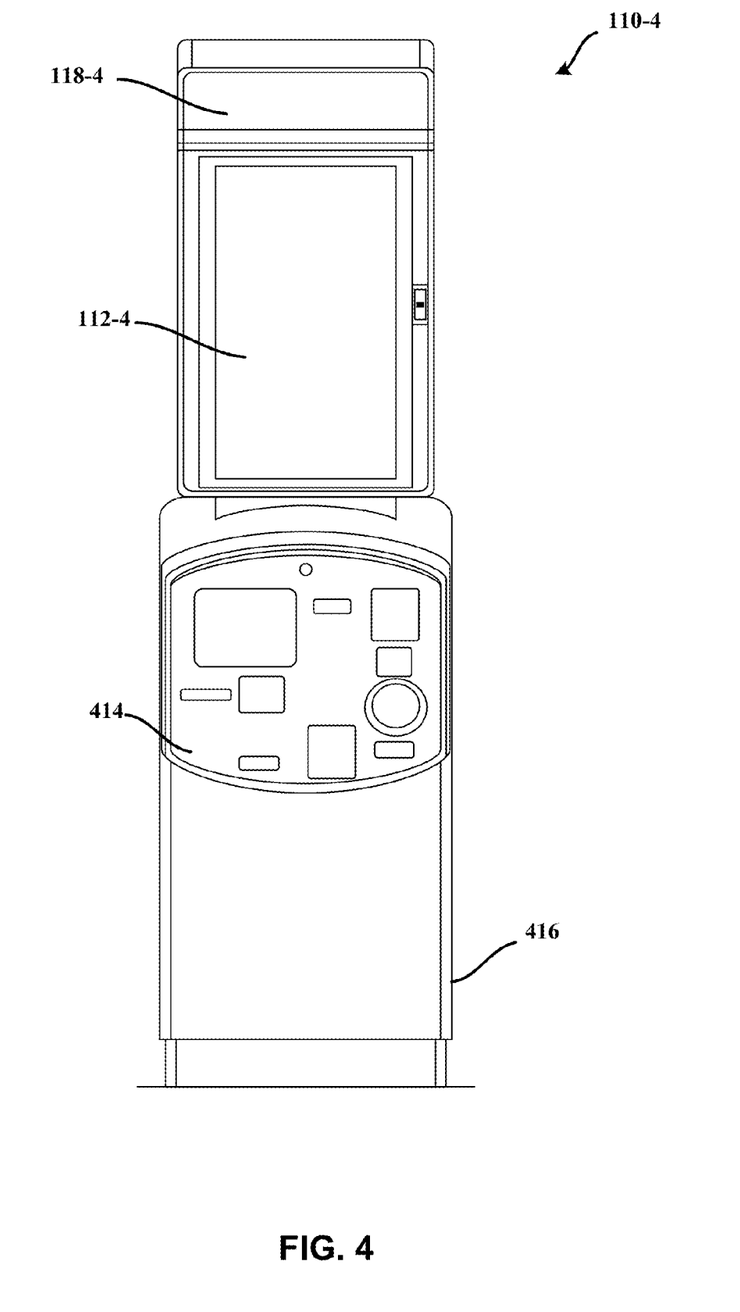
FIG. 4 illustrates an embodiment of a Video Ticket Office.

Referring now to FIG. 4, an exemplary embodiment of a configuration for a VTO 110-4 is shown. In the embodiment shown, the VDS 112-4 is mounted atop a cabinet 416. The cabinet may house the physical components of the computer and communication module, input and output devices, and electrical connections. The VDS may have a camera and microphone integrated with the video display.

The embodiment shown of the VTO 110-4 comprises a single panel 414 on which are located the input and output devices as described above in relation to FIG. 1. The embodiment shown faces a front side of the VTO. The expected user location would be facing the front side within reach of the panel.

In the embodiment shown, a speaker system 118-4 may be mounted above the VDS, and may direct sound in a generally downward direction. The speaker system, in conjunction with one or more microphones, may use a noise or voice cancelling system so that only a user in the expected user location would hear a speech from an agent, and/or speech of the user would be cancelled outside of the expected user location.

Figure 5A:
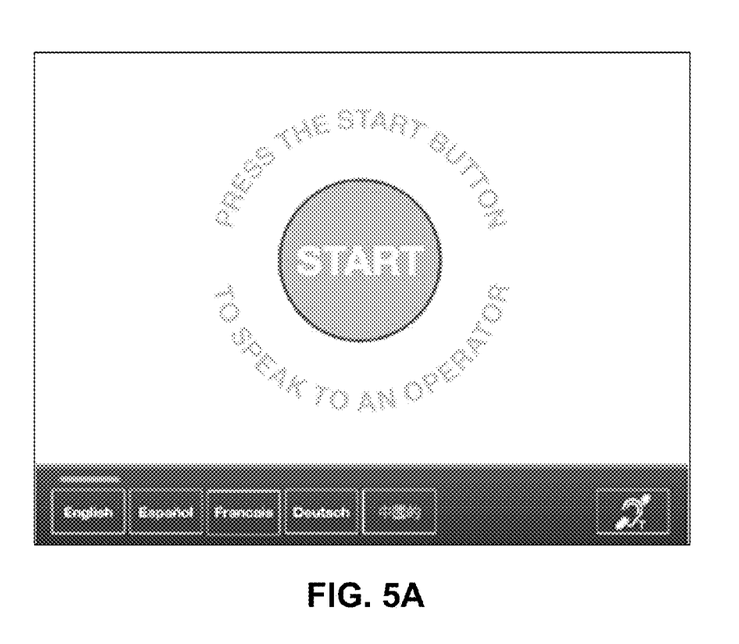
FIG. 5 illustrates an example of display on a display device.
Figure 5B:
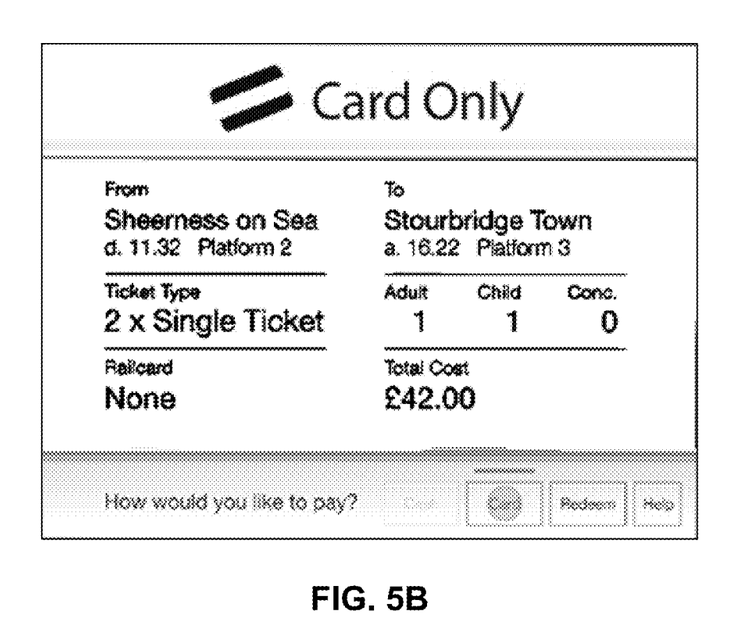

Referring now to FIGS. 5A and 5B, two exemplary embodiments are shown of two images which may be displayed on an auxiliary display screen, such as described above in relation to VTO 110-3. In FIG. 5A is shown an exemplary embodiment of an image displayed on a touchscreen auxiliary display screen after a user has hit a start button to initiate interactive service with an agent at an operator center. In an embodiment a user may have an option of selecting the language in which to speak with an agent. An advantage of providing interactive service by an operator center is that the operator center may have available agents with a variety of language abilities. Staffing a single station with sufficiently many agents to provide service in several languages could be very expensive.

In FIG. 5B is shown an image of a menu that is displayed on a touchscreen auxiliary display screen. The image shows an itinerary, ticketing information and a payment option. This information may have been determined by an interaction of a user with an agent. In an embodiment the agent with whom a user is interacting may control which images are displayed. In other embodiments, for example if the VTO was being used in an agent-free, automated self-service mode, the each image in a sequence of displayed images would be the result of a user selection made on the previous image.

It is to be understood that though FIGS. 5A and 5B are described as being shown on an auxiliary display screen, the images may be displayed on a portion of the VDS in such a manner that a user may still view and interact with an agent.

Figure 6:
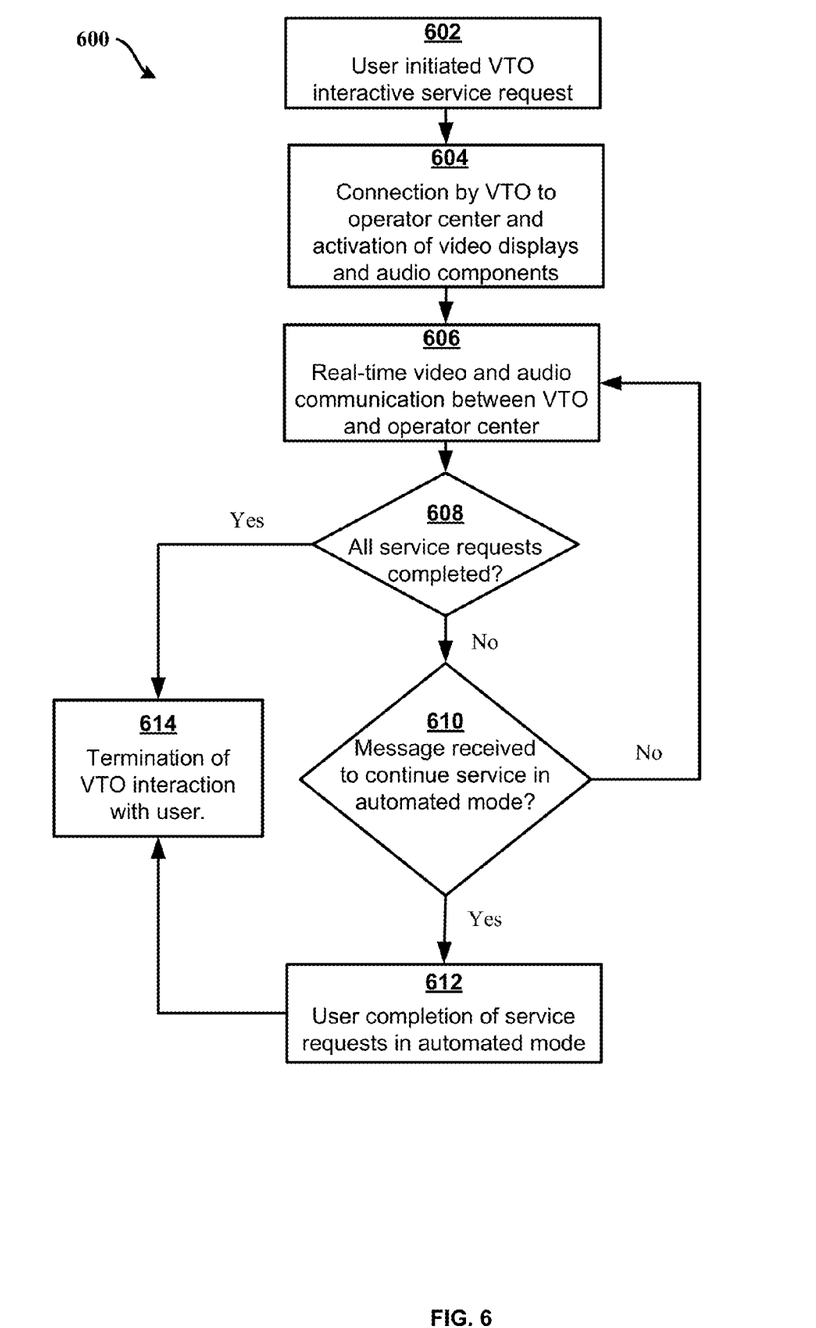
FIG. 6 shows an example of a method.

Referring now to FIG. 6, an embodiment of a method 600 is shown for providing interactive services between a user and an agent. Other embodiments may include similar methods in which certain functions are omitted, performed in a different order, performed simultaneously, etc. A person of ordinary skill in the art will recognize many variations. Some or all of the functions in the method 600 can be performed by a VTO, call center, communication link, and/or other components described in previous embodiments, and/or a computer system (which may be incorporated into one of these components) described below in relation to FIG. 7.

In 602 a VTO receives a request to begin providing interactive service between a user and an agent. In one embodiment the request is initiated by a user interacting with the VTO. The request may be initiated by pressing a start button, either a dedicated start button or a start button on a touch screen display, or by another means. In another embodiment, the request may be initiated when a user is detected entering an expected user location of the VTO.

Once the request has been received, at 604 the VTO sends a signal to the operator location to open a dedicated real-time communication link between the VTO and the operator center. In one embodiment, the VDS, microphone and camera of the VTO are activated. Such activation may comprise either being turned on, or being changed from a sleep mode to an active mode. At the operator center at least a monitor, camera microphone and speaker are activated to allow an agent to provide real-time video and audio interaction with a user at the VTO.

At 606 the real-time communication link between the VTO and the operator center transmits video images and audio speech of a user to an agent at an operator center, and transmits video images and audio speech of an agent at an operator center to a user at the VTO. The transmissions may continue as long as necessary for service requests of a user at the VTO to be met by an agent at the operator center.

As indicated in 608, during the course of interactive service between an agent and a user, all of the user's service requests may be met. For example, payment may be made and tickets issued to the user. In the case that all service requests have been handled, either by an input from the user or by an action by the agent, a signal may be sent to the VTO to end service with a user. As indicated in 614, the method ends with termination of interaction between the user and the VTO. In this example, the dedicated communication link may then be ended between the operator center and the VTO. In further examples, the VTO may enter a quiescent state.

At 610, it may be the case that during the course of real-time interactive communication with an agent, not all services desired by a user are completed during the communication with the agent, but that at least one remaining service may be able to be handled by the user using an automated responses mechanisms provided by the VTO. In such a case, a user may give an input to the VTO in order to complete the remaining service using the VTO in an automated mode of the VTO. In other exemplary embodiments, the message to switch from interactive mode to automated mode may be transmitted by an agent.

At 612 the method continues with the completion of remaining service requests being handled by the VTO in an automated mode for interaction with the user. Once the user's service requests are handled by the VTO in automated mode, the method terminates when the VTO interaction with the user ends, as indicated in 614.

Figure 7:
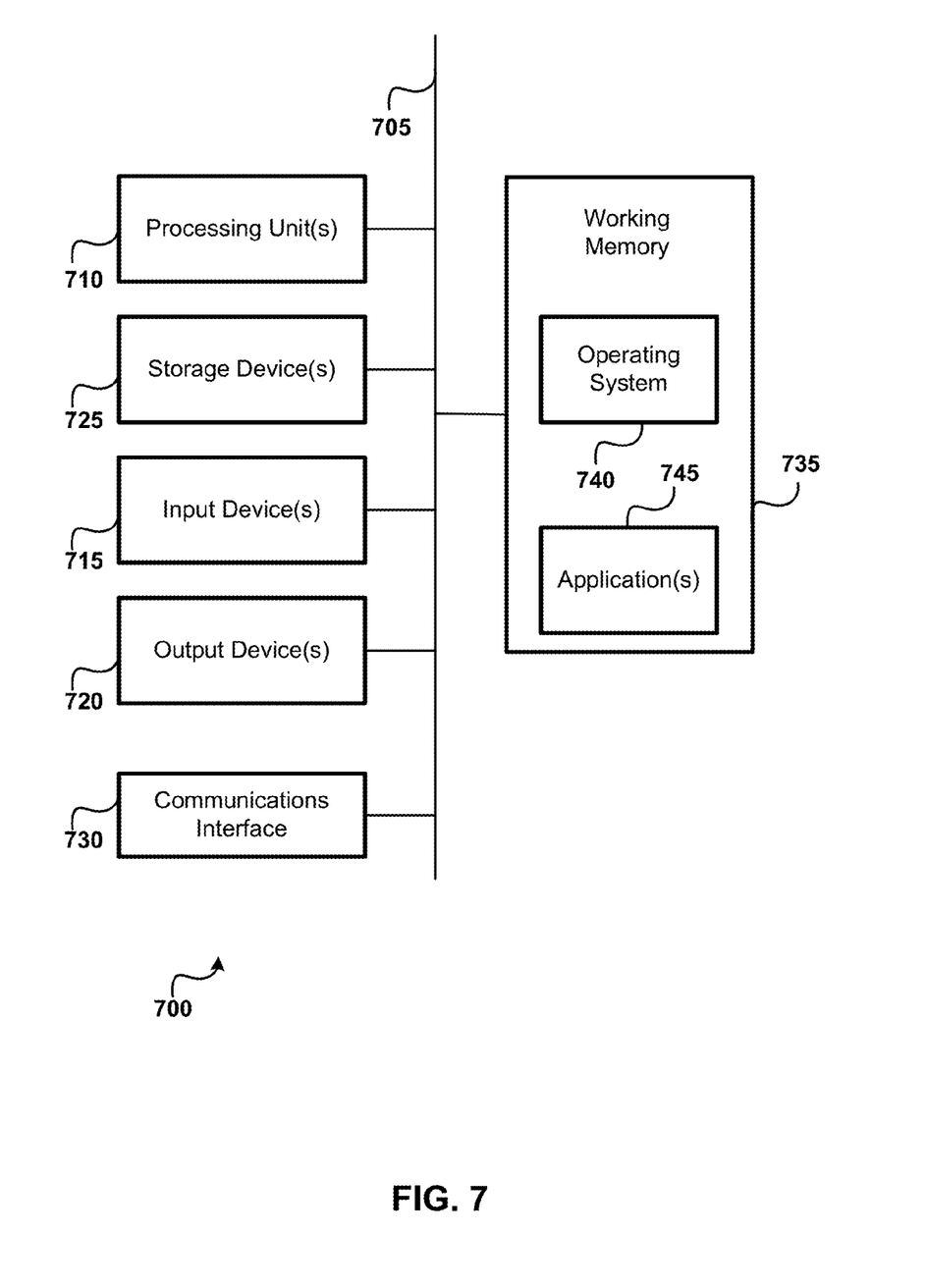
FIG. 7 shows an example of a computer system.

A computer system as illustrated in FIG. 7 may be incorporated as part of the previously described elements of a VTO or as part of the elements at an operator center. FIG. 7 provides a schematic illustration of one embodiment of a computer system 700 that can perform steps of the methods. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation any of the input devices previously described, as well as a mouse, a keyboard, and/or the like; and one or more output devices 720, which can include without limitation any of the output devices previously mentioned, as well as a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) may be the communication component previously discussed, or a separate element of the computer system 700. Generally the communications subsystem 730 will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed.

In the description above and the claims that follow, the word "a" or "an" preceding an element does not exclude the presence of a plurality of such elements.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. An apparatus implementing a Video Ticket Office (VTO) for providing an interactive agent-assisted transportation service, the apparatus comprising:
    a video display screen oriented to display in the direction of an expected user location;
    a video camera oriented to obtain images of the expected user location;
    a microphone oriented to receive sound from the expected user location;
    a speaker system oriented to direct sound to the expected user location;
    at least one input device;
    at least one output device;
    a communication interface module capable of transmitting and receiving real-time video and audio communications with a separately located operator center;
    an auxiliary visual display screen comprising a touch screen and configured to display prompts received from the operator center and to receive inputs and cause the inputs to be transmitted to the operator center; and
    a computer comprising memory and one or more processors communicatively linked to the video display screen, the video camera, the microphone, the speaker system, the at least one input device, the at least one output device and the communication interface module;
    wherein the processors execute instructions from the memory that cause at least one output device to transmit to the expected user a transportation service output, wherein the instructions further cause the processors to display on the auxiliary visual display screen information regarding service options, the information regarding service options being selected by a service agent at the operator center based on interaction with the user, and to transmit to the operator center a response, entered through the touch screen of the auxiliary display screen, regarding the service options displayed on the auxiliary display screen.

2. The VTO of claim 1, wherein the VTO is communicatively linked with a separate cash handler.

3. The VTO of claim 1, wherein the processors implement instructions to monitor the operational status of at least one of the at least one input device and the at least one output device, and to cause a signal about the status to be transmitted to the operator center.

4. The VTO of claim 1, further comprising speakers mounted to project directional sound downward to the expected user location.

5. The VTO of claim 1, wherein all input devices and output devices are configured on a single panel oriented facing the expected user location.

6. The VTO of claim 1, wherein at least one input device is a scanner.

7. A system comprising:
 an apparatus implementing a Video Ticket Office (VTO) for providing an interactive agent-assisted transportation service, the apparatus including:
  a video display screen oriented to display in the direction of an expected user location;
  a video camera oriented to obtain images of the expected user location;
  a microphone oriented to receive sound from the expected user location;
  a speaker system oriented to direct sound to the expected user location;
  at least one input device;
  at least one output device;
  a communication interface module capable of transmitting and receiving real-time video and audio communications with a separately located operator center;
  an auxiliary display screen comprising a touch screen and configured to display prompts received from the operator center and to receive inputs and cause the inputs to be transmitted to the operator center;
  a computer comprising memory and one or more processors; and
  wherein the memory comprises instructions that when executed by the one or more processors cause the processors to:
   instruct the communication interface module to establish a real-time interactive communication link with the separately located operator center;
   to output on the video display screen and speaker system video and audio signals of an operator at the operator center;
   to display on the auxiliary visual display screen information regarding service options, the information regarding service options being selected by a service agent at the operator center based on interaction with the expected user, and to transmit to the operator center a response, entered through the touch screen of the auxiliary display screen, regarding the service options displayed on the auxiliary display screen; and
   cause at least one output device to transmit a transportation service output to a user.

8. The system of claim 7, wherein the VTO is communicatively linked with a separate cash handler.

9. The system of claim 7, wherein the memory includes instructions which cause the one or more processors to monitor the operational status of at least one input device or output device, and to cause a signal about the status to be transmitted to the operator center.

10. The system of claim 7, wherein the at least on input device and at least one output device are configured on a single panel oriented facing the expected user location.

11. The system of claim 7, wherein at least one input device is a scanner.

12. A method of providing an interactive agent-assisted transportation service between a Video Ticket Office (VTO) apparatus and a separately located operator center, the method comprising:
 receiving a user input to initiate agent-assisted interactive transportation service;
 generating a request from the VTO to the operator center to have agent-assisted transportation service provided interactively;
 establishing an interactive agent-assisted transportation service communication link between the VTO and the operator center;
 receiving the interactive agent-assisted transportation service using real-time video and audio communication between the VTO and the operator center over the interactive agent-assisted transportation service communication link;
 displaying on an auxiliary display screen, located on the VTO and comprising a touch screen, information regarding service options, wherein the information displayed on the auxiliary display screen is selected by an agent at the operator center based on interaction with the user;
 transmitting to the operator center a response, entered by the user through the touch screen of the auxiliary display screen, regarding service options displayed on the auxiliary display screen; and
 transmitting to a user a transportation service output.

13. The method of claim 12, further comprising:
 receiving a request to complete the transportation service in an automated mode at the VTO;
 terminating the interactive agent-assisted transportation service communication link upon reception of the request to complete the transportation service in an automated mode at the VTO; and
 completing the transportation service in an automated mode at the VTO.

14. The method of claim 12, further comprising communicating between the operator center and a cash handler to accept a payment for a service, wherein the cash handler is separate from the VTO.

* * * * *